United States Patent
Weiser

(10) Patent No.: US 6,725,520 B1
(45) Date of Patent: Apr. 27, 2004

(54) METHOD AND DEVICE FOR PRODUCING SINGLE OR MULTI-LAYER, FIBER-REINFORCED FLAT PRODUCTS

(76) Inventor: Wolfgang Weiser, Diezelweg 17, 40468 Düsseldorf (DE)

( * ) Notice: Subject to any disclaimer, the term of this patent is extended or adjusted under 35 U.S.C. 154(b) by 0 days.

(21) Appl. No.: 10/070,103

(22) PCT Filed: Aug. 16, 2000

(86) PCT No.: PCT/EP00/07966

§ 371 (c)(1),
(2), (4) Date: Jun. 5, 2002

(87) PCT Pub. No.: WO01/15878

PCT Pub. Date: Mar. 8, 2001

(30) Foreign Application Priority Data

Aug. 30, 1999 (DE) .......................... 199 41 074

(51) Int. Cl.⁷ ............................ B21D 39/03; B23P 21/00
(52) U.S. Cl. .............................. 29/430; 29/429; 29/771
(58) Field of Search .................... 29/430, 429, 428, 29/432, 446, 700, 771, 822; 156/346, 510; 425/92, 122, 308

(56) References Cited

U.S. PATENT DOCUMENTS

| 1,749,436 A | | 3/1930 | Meier |
| 2,575,092 A | | 11/1951 | Bouvier et al. |
| 2,786,254 A | * | 3/1957 | Le et al. .................. 264/71 |
| 3,972,972 A | * | 8/1976 | Yano et al. ............... 264/117 |
| 4,420,295 A | * | 12/1983 | Clear et al. ............... 425/92 |

FOREIGN PATENT DOCUMENTS

| DE | 559483 | 9/1932 |
| DE | 1945779 | 4/1970 |
| DE | 1955800 | 5/1971 |
| DE | 2412192 | 9/1975 |
| EP | 0292452 | 11/1988 |
| EP | 0758944 | 7/1998 |
| FR | 2323504 | 4/1977 |
| WO | 9828116 | 7/1998 |

* cited by examiner

Primary Examiner—John C. Hong
(74) Attorney, Agent, or Firm—Friedrich Kueffner

(57) ABSTRACT

The invention relates to a method for producing multi-layer flat products (26). Said flat products preferably comprise a core (1) of solid material, laminated with a number of layers which are processed in a sequence of work steps into the final product.

12 Claims, 5 Drawing Sheets

METHOD AND DEVICE FOR PRODUCING SINGLE OR MULTI-LAYER, FIBER-REINFORCED FLAT PRODUCTS

BACKGROUND OF THE INVENTION

1. Field of the Invention

The invention relates to a method for manufacturing a single-layer or multi-layer, fiber-reinforced flat product, optionally with a core of solid material, laminated of several layers which are processed to the end product in a sequence of working steps.

2. Description of the Related Art

Flat products of concrete or other hydraulically setting materials are known. For example, the document WO-98/28116 describes a method and a device for manufacturing a flat product with a fiber-reinforced concrete matrix. The manufacturing method which is used in this context, wherein a hydraulically setting material is applied as a matrix with admixed reinforcement fibers in uniform thickness onto a support, is characterized in that a grate structure made of wire is placed onto the layer, is pressed into it with defined force and depth with stabilization of the not yet set layer, wherein in this connection a predetermined compression is generated and, after uniform embedding of the fibers in the matrix layer as well as after their compaction and degassing, the wire mesh is again removed in order to allow the material to set. The working steps which follow one another in this context are carried out on a horizontal support which is supported on a plurality of support rollers for preventing downward bending.

EP-0 758 944 B1 discloses a method and a device for the continuous manufacture of fiber-reinforced shaped bodies of hydraulically binding materials. The method which is used in this connection is characterized in that a) the conveying means are supports which determine the desired optical appearance of the layers and onto which the flat arrangements of fibers are placed as a reinforcement, b) the reinforced layers with the supports are conveyed against one another and, by employing cylinder rollers with simultaneous injection of an additional material as an intermediate layer, are then conveyed through the gap formed between the cylinder rollers and, under controlled predetermined pressure, the reinforced layers and the supports are combined and connected to one another to a product shaped on both exterior surfaces and, in this way, are subjected to a thickness calibration, and c) the formed product, directly after passing the roller gap, is deflected into a removal direction by using the cylinder rollers and transported away with the supports adhering thereto.

SUMMARY OF THE INVENTION

Based on the aforementioned prior art, it is an object of the invention to further develop and improve the known methods and devices and to perform in this connection an uncomplicated production method in a compact production device in several planes positioned atop one another, which method produces exactly calibrated flat products with highest surface quality.

As a solution to this object it is proposed with the invention for a method of the aforementioned kind to carry out the entire sequence of working steps, such as forming a single-layer or multi-layer strand, shaping, cutting to length, individualizing, transporting, stacking, removing from the mold, while the material is in an edgewise position.

One embodiment of the method proposes that the layers of the multi-layer flat product are first combined, while horizontally transported as well as subjected to the effect of shaking energy, to a single-layer or multi-layer laminate and these laminates, after deflection to a vertical transport with continued shaking and compaction, are laminated to the core(s), transported vertically at the same speed, to an endless basic material strand, and the latter, with continued transport movement, is introduced between vertically positioned or suspended intermediate mold spaces of provided support molds, secured after filling of each support mold at its head portion between clamping beams in a suspended position, separated from the strand, and the individualized flat products are then cut to length in the vertical position while suspended, allowed to solidify, and then supplied to a final storage facility.

As a result of production in the vertical direction, i.e., edgewise and with shaping working steps "in a stack", a more uniform compaction on both sides is advantageously achieved with improved surfaces, exact calibration by means of intensive shaking as well as with extremely economic work expenditure upon passing of a calming zone between traction elements.

A further configuration of the invention proposes that the core which later becomes hard is manufacture of concrete or lightweight concrete or polyurethane (PU), styrofoam, and/or the like materials, that for the first sandwich layer a material such as nonwoven material, for the second sandwich layer a material such as reinforcement fiber arrangements, for example, fiberglass mats, and for the third sandwich layer a material, such as, for example, plastic or rubber foil, are used.

A special advantage of the method is that the production of the flat products is carried out in three planes A, B, C stacked atop one another and formed by working platforms, wherein the uppermost plane A provides the supply of core material, the center plane B is provided for forming the basic material strand, and the lowermost plane C provides the support mold supply and serves for performing the working steps such as final shaping, cutting to length, solidification storage, and stocking the finished flat products.

In a freely suspended area between the planes B and C, pre-profiling can be carried out in a calming zone. Subsequently, a layer configuration, calibrated with regard to thickness and freely suspended and thus easily deformable, together with laminated-in reinforcement/flat arrangements and short fibers, is pressed by support molds into a "stack" that is laterally forwardly moveable by means of pushed trailing support molds and, during pressing, is subjected to a final shaping and is then cut to length by a saw. The stack, which in this context is, for example, supported on rails or suspended therefrom, can be transported farther continuously by pushed trailing stack elements with final deformation of the flat products.

Along the transport path, clamping beams, resting from above on the support molds and preventing soiling of the upper edges of the support molds during cutting to length and, at the same time, securing the layer configuration and prevent it from slipping through, can be lifted off the support molds by the pushing action of the trailing support molds, for example, on a slantedly arranged ramp. Trimming can now be carried out by means of stationary saws on the projecting solidified upper ends of the elements, and, as a result of the suspension of the elements from the mold in the downward direction, also at this location by means of fixed saws without requiring removal of the elements from the stack.

In the case of sandwich constructions, for example, with embedded stiff material as a core, as well as with reinforcements, heating or other tubes, or lightweight additives in "soft" mortar material, the desired positioning remains intact by avoiding deflection in the case of vertical manufacture, and this results in the following advantages:

- the support molds do not serve as a manufacturing support and can therefore be easily cleaned and reused after removal from the molds as a result of minimal soiling;
- an intensive shaking and thus compaction as far as possible is carried out initially without support molds because they are required only in the subsequent working steps for the "molding compression";
- a downward bending of horizontally positioned molds is prevented;
- the free suspension results in a slight pre-stress effect;
- during vertical compression, in contrast to the horizontal molding processing, a reduced friction for profiling results;
- removal from the mold in the vertical position causes less stress because, in contrast to the production in the horizontal position, no downward bending occurs;
- sawing in the stack avoids unnecessary handling;
- the assistance by gravity reduces the energy expenditure during handling;
- a more dense stacking is possible because, in contrast to stacked molds, pressure build-up as well as bending loads are prevented or substantially reduced;
- as a result of tight stacking with mutual heat development of the plates a faster solidification is achieved;
- in the case of vertical stacking the transport and footprint area requirements are reduced;
- for the vertical shaping devices, transporting devices, and storing devices, simpler support mold configurations are sufficient;
- by being suspended under its own weight, the reinforcement of the elements remains free of folds;
- the engagement of, for example, wire mesh or "pushers" for positioning and compaction is avoided so that also soiling and labor-intensive cleaning are eliminated;
- the configuration of tongue and groove is simpler because of the continuous support during suspension in comparison to the horizontal arrangement, excess material can be more easily stripped off and removed;
- as a result of optimal positioning of the reinforcement layers, for example, by means of deflection rollers on each supply side it is possible to save reinforcement;
- because the elements in the support molds have no tendency to bend downwardly, comparatively greater element lengths and widths can be realized without problem.

Further advantageous embodiments of the method suggest that a uniform compaction of the basic material strand on both sides for an optimal surface quality and exact calibration is performed by intensive horizontal shaking of the layers combined for lamination and vertical shaking is carried out after their placement against an optionally hard core.

Moreover, the basic material strand, after compaction on both sides, is moved by means of belts in the downward direction, wherein it is subjected to a first calibration and, by applying a vacuum, is dehydrated as much as possible before the final calibration.

A device for manufacturing multi-layer flat products with a core of solid material, and, for example, a first sandwich layer of comparatively soft material, a second sandwich layer of reinforcement fiber arrangement, as well as a third external sandwich layer of foil-shaped mold material, in particular, for performing the method according to the invention, is characterized in that it has a production platform with three working planes A, B, C spaced apart from one another vertically.

A special configuration of the device in this connection suggests that the uppermost plane A for supplying core material in the form of a vertical stack of plates has means for the continuous transport in rows without spacing of vertically positioned plates of an endless strand into the working planes B or C positioned underneath, and that the conveying paths have shakers which at their ends are deflected adjacent to the strand into vertical conveying paths with shakers, adjoined by vertical conveying and calibration means in the form of endless circulating traction elements, which transport the strand for final shaping and individualization into the lowermost working plane C.

Further embodiments are provided according to the dependent claims.

BRIEF DESCRIPTION OF THE DRAWINGS

Details, features, and advantages of the invention result from the following explanation of an embodiment schematically illustrated in the drawings.

It is shown in.

DESCRIPTION OF PREFERRED EMBODIMENTS

Figure 1:
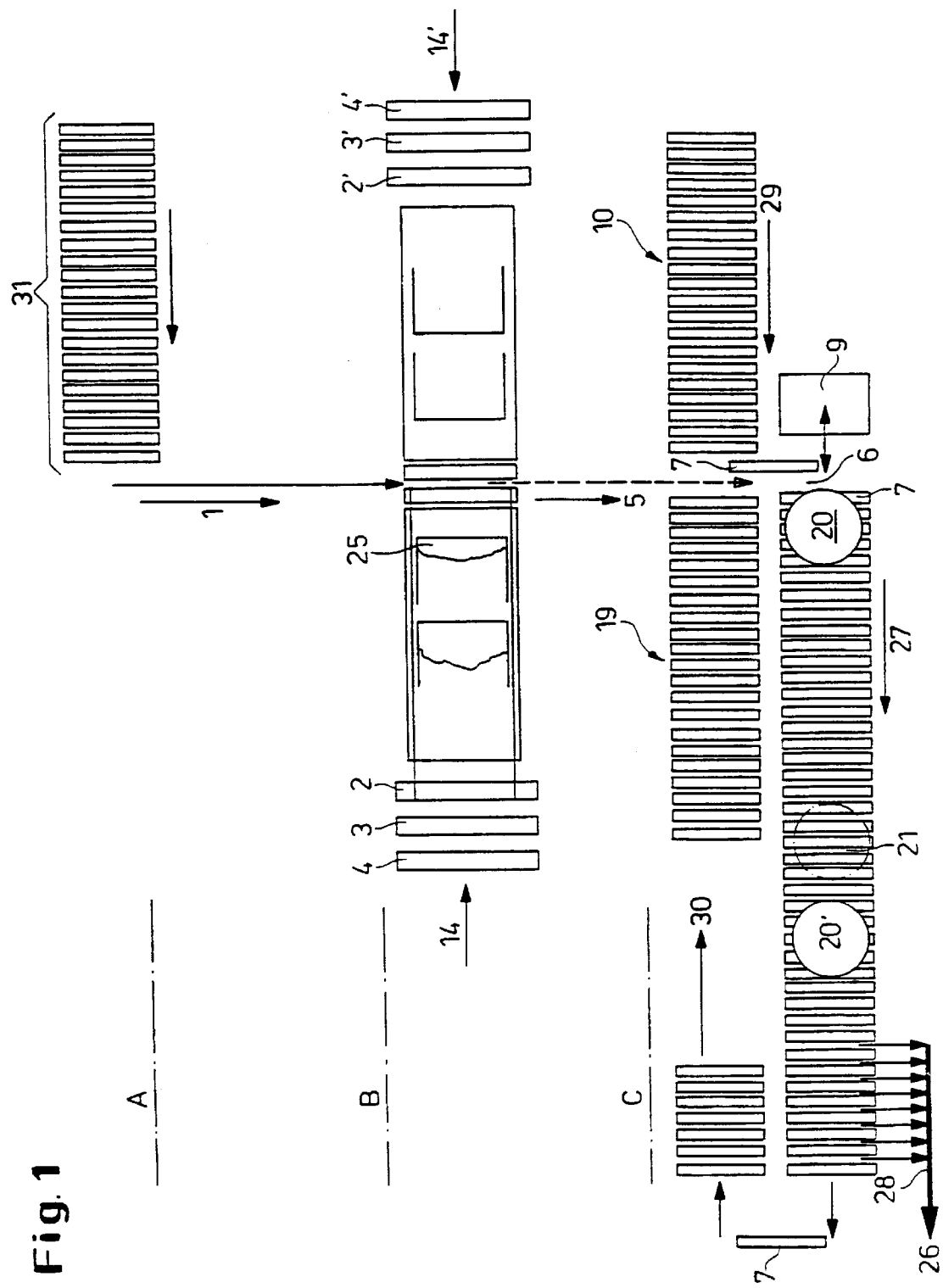
FIG. 1 plan views onto the different working planes A, B, C, of a working platform, similar to a method flowchart.

The method flowchart according to FIG. 1 shows the processing method for producing single-layer or multi-layer flat products 26 with, for example, a core 1 of solid material, laminated with a first inner sandwich layer of comparatively soft material 2, 2', for example, mortar, a second central sandwich layer of reinforcement fiber arrangement 3, 3', as well as a third outer sandwich layer of foil-shaped or nonwoven mold material 4, 4'.

As a single-layer material, for example, a basic material strand of a concrete matrix with embedded wire mats or fiberglass mats is used which have a high hole proportion of approximately 30–90% and are penetrated by the basic material. The outer foil 4, 4' generally does not belong to the finished product 26 because, after solidification of the finished product 26, it is removed again. The core 1 can also be comprised of two homogenous soft layers of identical material that is formed to a single-layer basic material strand which is provided with outer foils 4, 4' which prevent an accidental outflow of material.

Figure 2:
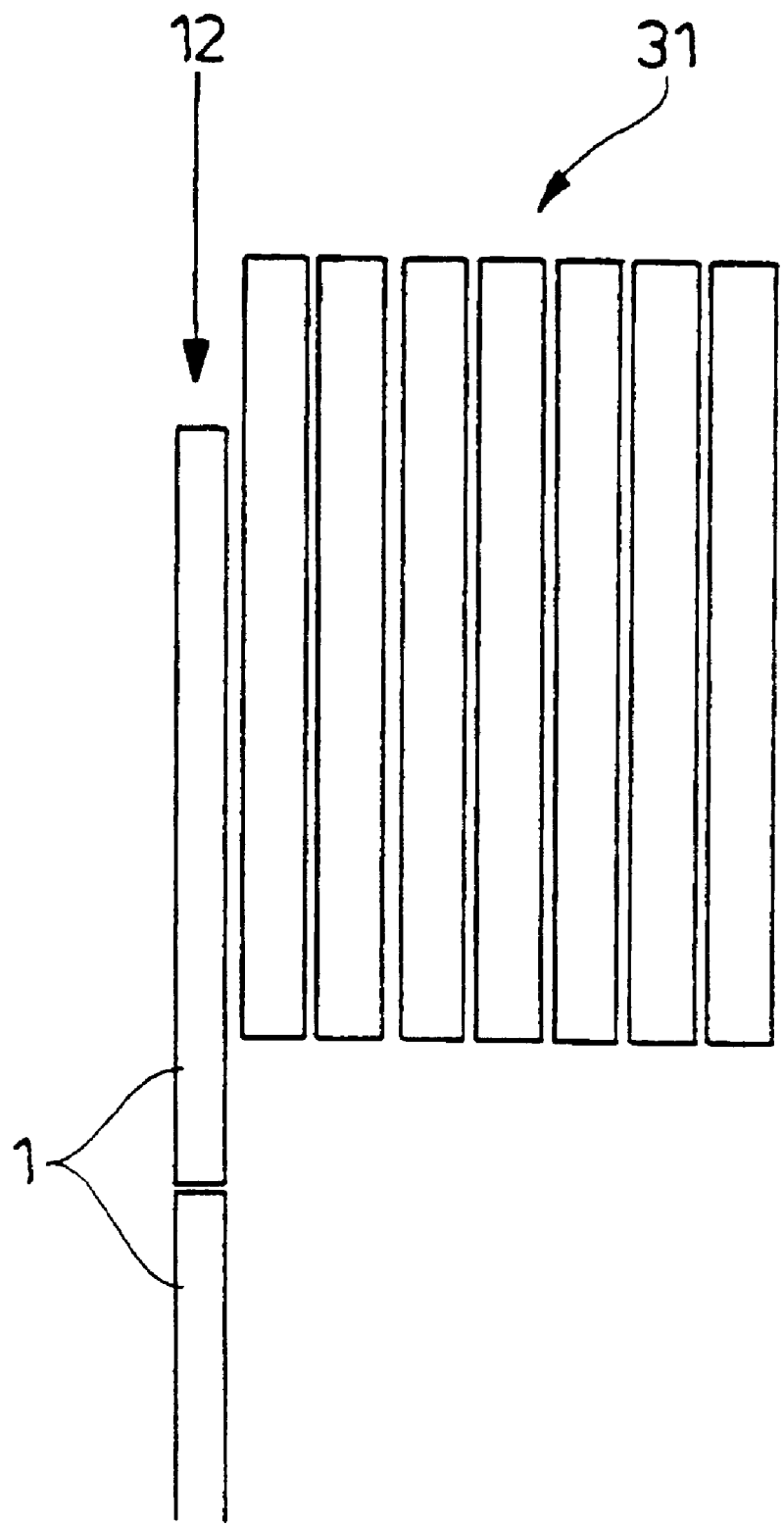
FIG. 2 a plan view onto working plane A.
Figure 3:
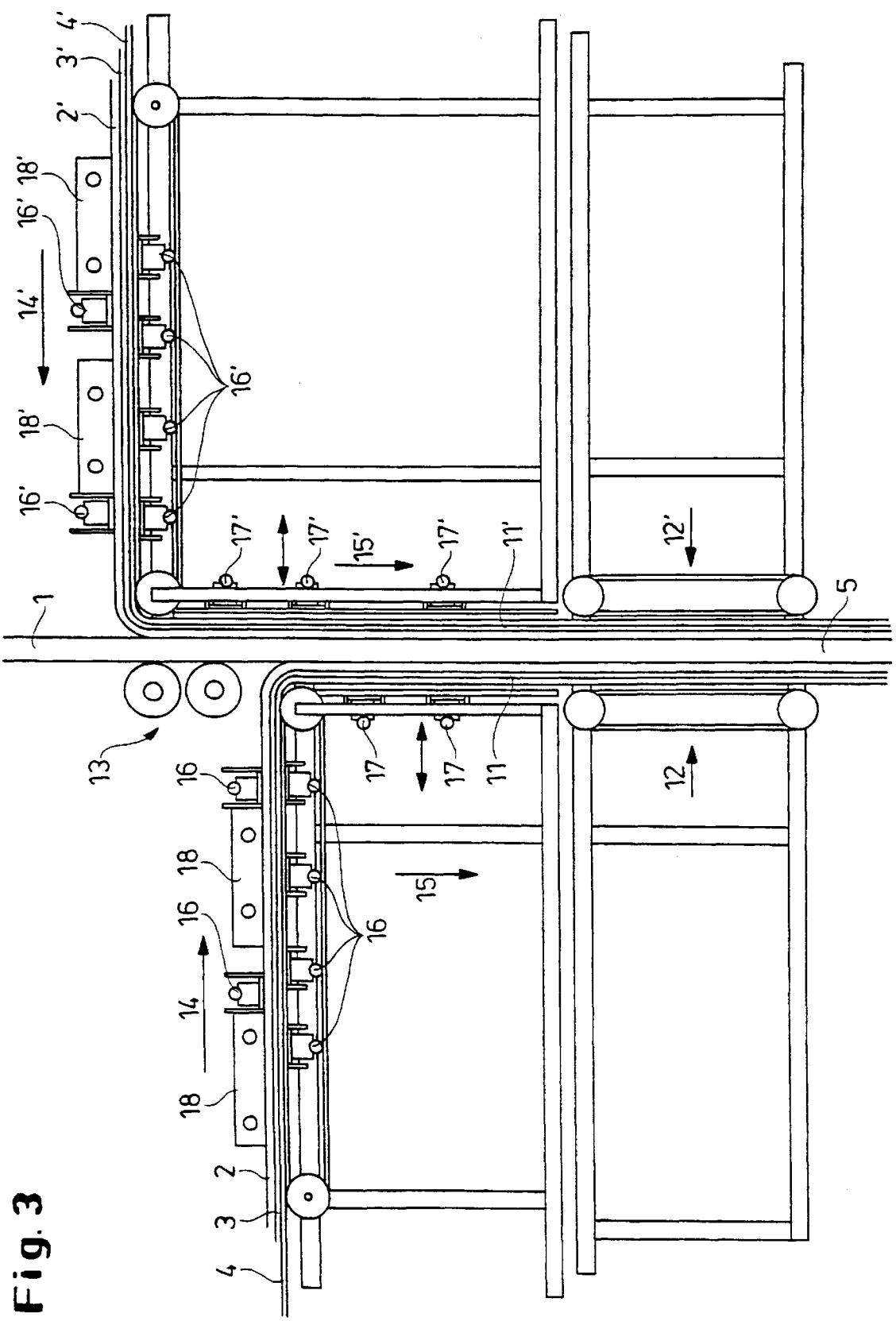
FIG. 3 in a side view a part of a working platform with the working plane B.

In this connection, FIG. 1 shows together with FIGS. 2 and 3 that the production of the flat products 26 is carried out in three planes A, B, C in the form of working platforms stacked atop one another, wherein the uppermost plane A provides the supply 31 of core material 1, the center plane B is provided for forming the basic material strand 5 with the layers 2–4 and 2'–4', and the lowermost plane C provides a support mold supply 10, 19 and is provided for performing the working steps such as final shaping, cutting to length by means of the saws 20, 20', 21, hardening storage, and stocking the finished surface product 26.

Important in regard to the method of the invention is the feature that the entire sequence of working steps such as forming of the strands 1, 5, shaping, cutting to length, individualization, removal from the mold, transportation, stacking, is realized in an edgewise position of the material.

The layers 2, 3, 4 as well as 2', 3', 4' are first combined in the horizontal transport direction under the effect of shaking energy to multi-layer laminates 11, 11' (FIG. 3) and, after deflection to the vertical transport with continued shaking, are laminated onto the vertically conveyed core 1 to from an endless basic material strand 5. The latter is introduced with continuing transport movement between vertically positioned intermediate mold spaces 6 of the provided support molds 7, secured after filling of each mold at their head area between clamping beams 8 (FIG. 4) in a suspended position, separated from the strand 5, and the individualized flat products are cut to length in the vertical position, allowed to solidify, and supplied as the finished end products 26 to a final storage facility.

A uniform compaction on both sides of the basic material strand 5 for obtaining an optimal surface quality and exact calibration is realized according to FIG. 3 by intensive horizontal shaking by means of shakers 16, 16' as well as vertical shaking by means of shakers 17, 17' and shaker plates arranged thereat. The shaker plates ensure an extremely smooth and plane configuration of the basic material strand 5.

Furthermore, FIG. 3 shows a somewhat higher configuration of the right working plane B so that the working stand on this side projects by a certain amount past the working stand on the left side. On this projecting part two pressing rollers 13 are arranged on the left which effect an exact positioning and tight contact of the incoming solid core 1.

Subsequent to the contacting of the layers 2, 3, 4 and 2', 3', 4' on the core 1 and a compressing action by means of vibration of the shakers 16, 17 and 16', 17', the basic material strand 5 is pulled in a calming zone vertically downwardly, calibrated in this way, and dehydrated as much as possible, preferably by applying a vacuum. In this context, an after-calibration by processing by means of traction elements 12, 12' can be performed.

Figure 4:
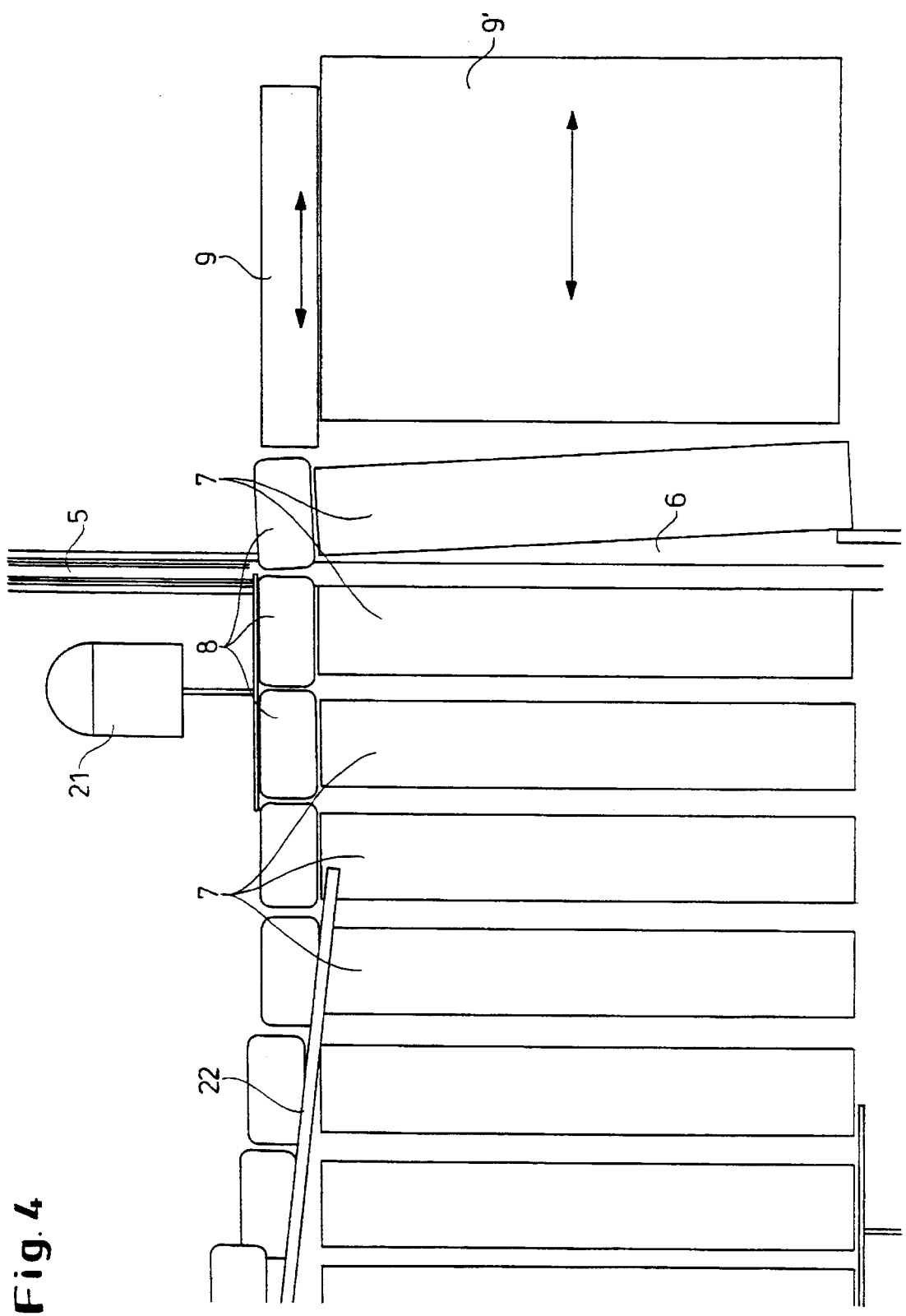
FIG. 4 in a side view a stack of support molds with clamping beams positioned thereon and a pressing block with spring-supported pressing plunger.
Figure 5:
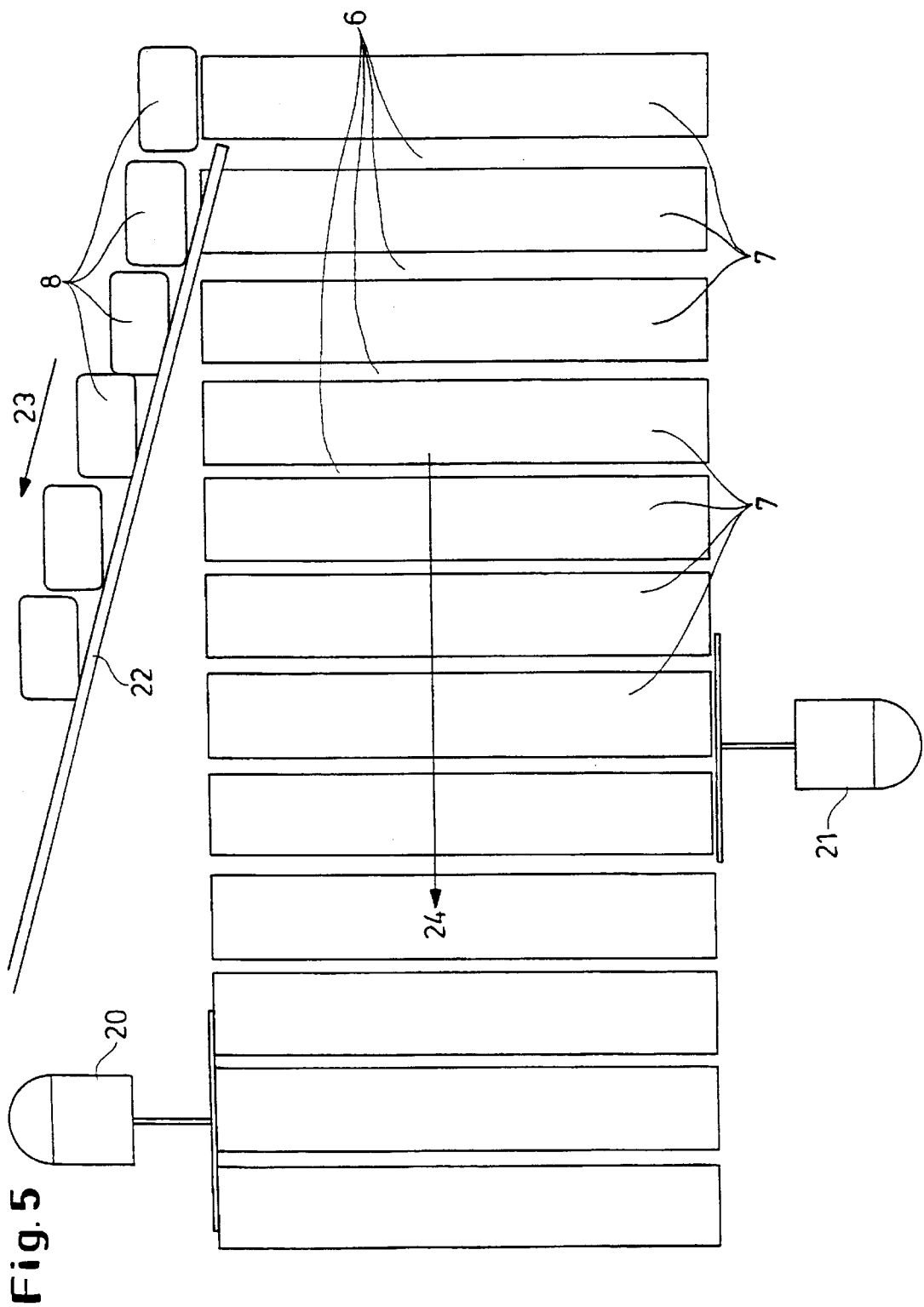
FIG. 5 in a side view a stack of support molds and clamping beams shown at the moment of lifting off by means of the ramp.

In one embodiment of the method the compacted and optionally substantially dehydrated basic material is secured so as to be suspended freely in the lowermost working plane C with worked-in flat reinforcement arrangements 2, 3, 4 or 2', 3', 4', as is illustrated in FIG. 4, after being received in an intermediate mold space 6, between two support molds 7, respectively, as well as between clamping beams 8 in the head area, then cut off 21 from the strand 5, and, with pressure action of the pressing block 9, 9' which loads each trailing support mold 7, provided with the final shaping before the final solidification. Subsequently, the clamping beams 8 according to FIG. 5 are lifted off, the pre-finished flat product is removed from the mold, allowed to solidify, and stacked. The method according to the invention is furthermore characterized in that the flat product, while being freely suspended between two support molds 7, is cut to length at the lower edges by means of the saw 21 to the desired size while in the stack before removal.

In the case of using a liquid matrix material for forming one of the layers 2 or 2', 3', according to FIG. 3 an arrangement of dispensers 18, 18' can be provided.

A device for performing the method according to the invention is particularly also characterized in that it has a production platform with three working planes A, B, C spaced apart from one another vertically. In the uppermost plane A for supplying the core material 31 in the form of a vertical stack of plates, means 12 for their continuous transport in the form of rows of vertically positioned plates 1 without spacing of an endless strand 5 into the working plane B or C arranged underneath are provided, and the plane A has horizontally extending, oppositely oriented conveying paths 14, 14' with shakers 16, 16' for removal of layer material 2, 3, 4 from supplies as well as for forming multi-layer laminates 11, 11'. They are deflected at their ends adjacent to the strand 5 into conveying paths 15, 15' provided with shakers 17, 17'. Vertically extending conveying and calibration means in the form of endlessly circulating traction elements 12, 12' adjoin the paths 15, 15' which transport the strand 5 to the final shaping and individualization into the lowermost working plane C. It has a supply 10, 19 of support molds 7 whose loading pressure means 9, 9' have lower and upper cutting-to-length saws 20, 20' and 21 as well as conveying means 27–30.

The method and the device according to the invention provide, for a comparatively minimal expenditure of energy and means, optimal flat products with high surface quality and calibration precision and, in this way, solve in an ideal way the aforementioned object.

What is claimed is:

1. A method for manufacturing a multi-layer flat product (26) in a vertical position from an endless basic material strand (5) positioned on edge, the method comprising the steps of:

preparing a basic material strand (5) by initially horizontally transporting several layers and exposing the layers to shaking energy to form multi-layer laminates, deflecting the multi-layer laminates in a vertical direction, and, while transporting the multi-layer laminates in the vertical position, exposing the muiti-layer laminates to shaking energy to form a compacted plate or attach the multi-layer laminates to a core of solid material to form a core with attached laminates, wherein the compacted plate or the core with attached laminates form the basic material strand (5);

filling the basic material strand (5) while being transported in the vertical direction into individual support molds (7);

cutting the basic material strand (5) to length into basic material strand sections while in a vertical position;

subjecting the cut-to-length basic material strand sections to final shaping and hardening in the support molds (7) to a hardened multi-layer flat product.

2. The method according to claim 1, wherein the core (1) is laminated of a first inner sandwich layer of comparatively soft material (2,2'), a second central sandwich layer of worked-in reinforcement fiber arrangement (3, 3'), and a third outer sandwich layer of foil, nonwoven or rubber mold material (4, 4').

3. The method according to claim 1, wherein the basic material strand (5), while being continuously transported, is introduced between vertically positioned intermediate mold spaces (6) of the individual support molds (7), is suspended, after filling of the mold spaces, at a mold head area between clamping beams (8) and separated from the basic material strand (5) to form an individualized flat product, wherein the individualized flat product is cut to length while in a vertical position, allowed to harden, and supplied to a final storage facility.

4. The method according to claim 2, wherein the core is made of concrete, wherein the first sandwich layer (2, 2') is a nonwoven material, the second sandwich layer (3, 3') is a reinforcement fiber arrangement in the form of a fiberglass mat, and the third sandwich layer (4, 4') is a plastic foil, a nonwoven or rubber foil.

5. The method according to claim 1, wherein three planes (A, B, C) in the form of working platforms stacked atop one another are provided, wherein in an uppermost one of the planes (A) a supply (31) of core material (1) is provided, wherein in a central one of the planes (B) the basic material strand (5) is formed, and wherein in a lowermost one of the planes (C) a supply of support molds is provided and the steps of cutting to length, final shaping, and hardening, and additional steps of storing and stocking of the hardened multi-layer flat product are carried out.

6. The method according to claim 5, wherein the basic material strand (5) is compacted on both sides for obtaining an optimal surface quality and exact calibration by intensive horizontal shaking of the layers (2, 3, 4; 2', 3', 4') when being combined to laminates and subsequent vertical shaking after attachment onto the core (1).

7. The method according to claim 6, wherein the basic material strand (5), after compaction on both sides, is pre-dehydrated by belts (12, 12') in a calming zone and is subsequently pulled vertically downwardly and thereby subjected to a first calibration, wherein the basic strand material is subsequently subjected to a vacuum for further dehydration.

8. The method according to claim 7, wherein, after further dehydration, the basic strand material (5), provided with flat in the lowermost working plane (C) is received in an intermediate mold space (6) of two support molds (7), secured freely suspended between clamping beams (8) at a mold head of the two support molds, the basic strand material (5) is cut to length, the support molds (7) are loaded with a pressing block (9) for carrying out final shaping, the clamping beams (8) are lifted off, and, after the step of hardening, the hardened multi-layer flat product is stacked.

9. The method according to claim 8, wherein the hardened multi-layer flat product is cut to length at lower edges thereof to a desired size by a saw (21) while being freely suspended between the two support molds (7) before removal from the two support molds and while still in the stack.

10. A device for manufacturing multi-layer flat products from a basic material strand comprised of several layers or comprised of a core of solid material having attached multi-layer laminates, for performing the method according to claim 1, the device comprising:

an uppermost plane (1), a central working plane (B) arranged underneath the upper most plane (1), and a lowermost working platform (C) arranged underneath the central working plane (B);

wherein the uppermost plane (A) is configured to supply material in the form of vertical stacks of plates and having means (12) for continuously transporting the plates arranged edgewise in an endless row into the central working plane (B);

wherein the central working plane (B) is configured to produce the basic material strand (5), wherein the central working plane (B) has horizontally extending, oppositely oriented first conveying paths (14, 14') with first shakers (16, 16') for removing layer material (2, 3, 4) from a supply and forming multi-layer laminates (11, 11'), wherein the horizontally extending, oppositely oriented first conveying paths (14, 14') are deflected into second conveying paths (15, 15') provided with second shakers (17, 17') where the basic stand material is formed from the multi-layer laminates, wherein the central working plane (B) comprises vertically arranged conveying and calibration means in the form of endlessly circulating traction elements (12, 12') adjoining the second conveying paths (15, 15'), wherein the traction elements (12, 12') transport the basic material strand (5) into the lowermost working plane (C);

wherein the lowermost working platform (C) has a supply of support molds (7), pressing means (9) for loading the support molds, upper and lower saws (20, 20'), clamping beams (8) and conveying means (27–30).

11. The device according to claim 10, further comprising a pair of pressing rollers (13) for vertically guiding the core, wherein the horizontally extending, oppositely oriented first conveying paths (14, 14') are arranged vertically displaced relative to one another and wherein the pair of pressing rollers (13) are arranged opposite a vertically higher one of the horizontally comprise extending, oppositely oriented first conveying paths (14, 14').

12. The device according to claim 10, further comprising matrix dispensers (18, 18') arranged above the horizontally extending, oppositely oriented conveying paths (14, 14') for applying a soft layer (2, 3; 2', 3') onto an external layer (4, 4') of the multi-layer laminate in a predetermined layer thickness.

* * * * *